2,861,968

United States Patent Office

Patented Nov. 25, 1958

2,861,968

FILM FORMING AQUEOUS COLLOIDAL DISPERSIONS CONTAINING NITROGENOUS CONDENSATION PRODUCTS AND PROCESS FOR PREPARING SAME

Paul A. Wolf and Francis J. Bobalek, Midland, Mich., assignors to The Dow Chemical Company, Midland, Mich., a corporation of Delaware No Drawing. Application December 19, 1955
Serial No. 553,689

10 Claims. (Cl. 260—29.6)

This invention relates to improved aqueous colloidal dispersions. It is particularly concerned with compositions comprising synthetic latexes and a method for making such compositions.

Synthetic latexes have found widespread application in the protective coating field. In such usage, the latex or a composition containing it is applied to masonry, metal or wood surfaces whereby films are formed which tend to adhere to the solid surface and protect the latter against marring and weathering. The latexes commonly are modified by the addition of pigments and other agents to provide latex paint compositions which have desirable properties as regards ease of application, ease of cleanup, self-sealing, alkali resistance and odor. The synthetic latexes are also employed as saturants for papers to improve such properties as tear resistance.

Certain problems have been encountered in the storage and application of synthetic latexes and compositions in which they are employed. For example, the synthetic latexes contain stabilizers and emulsifiers to maintain the polymer in the dispersed state. Many commonly employed stabilizers and emulsifiers are organic in nature and subject to attack by microorganisms. When the latexes are employed in latex paint formulations, they are modified with other additaments such as thickeners, pigment dispersants and stabilizers which are also subject to attack by bacteria and fungi. The resultant microbiological activity frequently results in undesirable alterations in viscosity of the latex system and unfavorably affects its spreading and odor characteristics.

In commercial latex paint formulation, various preservatives have been employed to prevent attack by microorganisms. To accomplish such control with phenols and their salts it has been found necessary to maintain the latex compositions at a pH of 9 or higher. However, to minimize viscosity changes caused by hydrolytic breakdown of common protein components, prevent detinning of containers and permit general flexibility in manufacture and use, it is desirable to have latex compositions that can be maintained at lower pH levels. Thus, the phenols and phenolates do not represent the ultimate as preservatives. Organic mercury compounds, on the other hand, are not only hazardous but unfavorably affect color stability in certain formulations.

Furthermore, it has been found that films cast from conventional latexes and latex paints are subject to decomposition, discoloration and breakdown upon exposure to light, temperature, and moisture. In addition, the problems of water sensitivity, spotting and rust staining of films of known latexes and water-emulsion paints in which they are employed, are limiting factors in the use of such compositions. The desirability of the provision of improved synthetic latex and latex containing compositions and of methods for avoiding the problems inherent in the applications of such compositions, is evident.

It is an object of the present invention to provide improved compositions of aqueous colloidal dispersions comprising synthetic latexes. A further object is to provide synthetic latexes characterized by properties of resistance to microbial attack and degradation. A further object is to provide a method for imparting improved properties of stability to latexes and aqueous colloidal dispersions in which they are employed. Other objects will become apparent from the following specification and claims.

According to the present invention it has been discovered that improved aqueous colloidal dispersions comprising synthetic latexes are obtained when there is incorporated into the synthetic latex a minor proportion of a water-soluble condensation product obtained by condensing from about one to three molar proportions of formaldehyde with one molar proportion of an aliphatic alkanol amine embodying a straight chain structure of at least 3 atoms of the group consisting of carbon and nitrogen, and including in the molecule at least one hydroxyl radical and at least one primary amino radical. The addition of such a condensation product imparts a beneficial stabilizing effect to the resultant colloidal dispersions. The improved dispersions are resistant to attack by microorganisms in the neutral and alkaline pH range. The free films and/or coatings formed from certain of such compositions, when said compositions are cast on solid surfaces and allowed to dry, exhibit stability to degradation such as discoloration, surface breakdown and staining normally caused by exposure to heat, light and/or water.

The expression "synthetic latex" as herein employed is intended to mean any aqueous colloidal dispersion of polymers of polymerizable olefinically unsaturated monomers exclusive of vinyl halide and vinylidene halide monomers. Examples of such polymeric materials are copolymers of mono-olefinically unsaturated compounds such as styrene, vinyltoluene and acrylonitrile with a conjugated diolefin such as butadiene; homopolymers and copolymers of styrene, acrylic and methacrylic esters; and homopolymers and copolymers of vinyl acetate. The synthetic latexes are aqueous dispersions usually containing in addition to the polymer, an emulsifying agent, polymerization catalysts and buffers. They may, in addition, contain other non-polymeric additives such as plasticizers or stabilizers. Typical of the synthetic latexes with which this invention is concerned are those described in U. S. Patent No. 2,498,712. Emulsifying agents which may be employed include sodium oleate, sodium sulfate esters of higher alcohols, or sodium sulfonates of alkylated naphthalenes. Representative catalysts are potassium persulfate or benzoyl peroxide. Buffers which are oftentimes used include sodium bicarbonate and sodium tetraborate.

The term "latex paint" as herein employed refers to an aqueous colloidal dispersion containing a synthetic latex composition as above defined to which has been added a pigment. The term "pigment" denotes colored as well as white pigments and is understood to be inclusive of mineral products used as fillers and extenders. In addition, pigment dispersants, thickeners and other paint making ingredients may be present in latex paint. These ingredients and latex paint compositions containing them are extensively described in the art, e. g. in U. S. Patent No. 2,498,712. Representative pigment dispersants are tetrasodium pyrophosphate and lecithin. Colloid stabilizers and thickeners which may be used include casein, $\alpha$-protein, and water-soluble cellulose derivatives.

The preferred polymeric materials to be contained in the synthetic latexes in accordance with the present invention are copolymers prepared from 25–75 percent of at least one conjugated aliphatic diolefin such as butadiene or isoprene and 75–25 percent of at least one vinyl aromatic compound such as styrene or vinyltoluene.

The aliphatic alkanol amine condensation products with which the present invention is concerned may be employed in any operable proportion. While good results may be obtained by adding 0.3 percent by weight of the alkanol amine condensation product when based on the weight of solids present in synthetic latex, the range of from 0.75 to 5 percent by weight is preferred. In preparing the improved colloidal dispersion, the water-soluble alkanol amine condensation product is blended with the synthetic latex by mechanical mixing. The alkanol amine condensation product is usually first dissolved in water, ethanol, 50:50 methanol-water or other suitable solvent and thereafter introduced into the latex with agitation. Good results have been obtained by employing water solutions containing 35 to 50 percent of the alkanol amine condensation product.

When the aqueous colloidal dispersion is a latex paint, desirable results may be obtained by employing the alkanol amine condensation product in an amount of from about 0.15 to 3 percent by weight. This percentage by weight is calculated on the basis of the dry weight of the alkanol amine condensation product in the total weight of the paint employed. The preferred range is considered to be 0.3 to 1.25 percent by weight. The incorporation of the alkanol amine condensation product into the paint may be made at any point in its manufacture. It may be introduced before or after the addition of the pigment dispersion to the latex or added to said dispersion. Conveniently, a solution of the alkanol amine condensation product may be blended into the formulated latex-paint.

A number of desirable properties characterize the aqueous colloidal dispersions provided by this invention. For example, all of the latex and latex paint compositions of the present invention are found to be resistant to microbial deterioration. This protective action is usually observed throughout the neutral and alkaline pH range. In addition, the films formed when certain synthetic latexes and paints containing them are cast on a solid surface have been found to exhibit stability against diverse degradative effects normally observed on exposure of such films to light and heat.

Representative synthetic latexes may be prepared by polymerizing mixtures of suitable monomeric compounds in aqueous emulsion in accordance with known procedures. As described in U. S. Patent No. 2,498,712, the polymerizable compounds, in proportions corresponding to the desired composition of the polymeric product, may be mixed with an aqueous solution of an emulsifying agent and the mixture agitated to effect emulsification. The emulsifying agent is ordinarily employed in an amount corresponding to from 0.5 to 5 percent of the weight of the polymerizable organic compounds, but it may be used in smaller or larger proportions. A catalyst such as a peroxide is usually added in an amount corresponding to from 0.5 to 4 percent of the weight of the compounds to be polymerized, but is not always required. A buffer may be added if desired. The emulsion is heated in a closed container, generally at temperatures between 50° and 100° C., to effect polymerization. After completion of the polymerization, the property of the resulting polymeric dispersion may be modified, if desired, by the incorporation in the dispersion of the other additives such as plasticizers or stabilizers.

An example of synthetic latexes which may be employed is a GRS type latex. A representative latex is an approximately 35 percent aqueous colloidal dispersion containing a copolymer of approximately 45 percent butadiene and 55 percent vinyltoluene prepared by emulsion polymerization. This operation can be carried out by charging a reactor with the following:

| | Parts by weight |
|---|---|
| Butadiene | 45.0 |
| Vinyltoluene | 55.0 |
| Water | 178.0 |
| Emulsifier (soap flakes) | 4.28 |
| Modifier (lorol mercaptan) | 0.45 |
| Catalyst (potassium persulfate) | 0.197 |

The mixture is agitated to effect emulsification and heated at a temperature of 50° C. for 28.5 hours to cause polymerization.

The resulting synthetic latex may be employed for the preparation of a paint emulsion. A typical paint may be formulated as follows:

| Ingredients: | Lbs./100 gals. |
|---|---|
| Titanium dioxide | 250.0 |
| Calcium carbonate | 50.0 |
| Clay | 50.0 |
| Diatomaceous earth | 25.0 |
| Potassium tripolyphosphate | 1.5 |
| Water | 144.0 |
| Casein 15%, borax cut [1] | 75.0 |
| Synthetic latex +4.0 parts/100 parts of total solids emulsifiers [2] (34.4% solids) | 479.0 |
| Antifoamer [3] | 10.0 |

[1] Casein solution is prepared by dispersing 15 parts casein in 83.2 parts cold water, adding 1.8 parts $Na_2B_4O_7 \cdot H_2O$ and raising the temperature slowly to 60° C. and maintaining it at that temperature while agitating for 30 minutes, then cooling.
[2] Igepal CO–630, a nonyl phenoxy polyoxyethylene ethanol.
[3] Nopco 1407 (20% solution), a blend of non-ionic and anionic surface active materials predominately non-ionic.

Variations may be made in the above formula as will be apparent to those skilled in the art.

The alkanol amine condensation product as herein employed may be prepared by mixing an appropriate alkanol amine and formaldehyde, preferably in the presence of a solvent such as water or alcohol and with cooling and agitation to maintain the temperature at or below 60° C. The resulting alkanol amine condensation product is a clear, colorless composition. The water formed during the condensation and the employed solvent optionally may be removed, preferably by vaporization under reduced pressure, to obtain a white solid product.

Alkanol amines suitable for the production of these condensation products include 1,3-diamino-2-propanol, 1-amino-2-butanol, 3-amino-1-propanol, ethanolamine, isopropanolamine and N-hydroxyethylpropylenediamine. Especially satisfactory as a component of the improved aqueous colloidal dispersion has been the alkanol amine condensation product obtained by the reaction of formaldehyde with 1,3-diamino-2-propanol. This product is described as to preparation and properties in an application of W. F. Tousignant, filed concurrently herewith, Serial Number 553,745, filed December 19, 1955 now Patent No. 2,823,234.

The following examples illustrate the invention but are not to be construed as limiting.

EXAMPLE 1

A water paint formulation employing a synthetic GRS type latex comprising a copolymer of 55 percent vinyltoluene and 45 percent butadiene and prepared as previously described was modified by adding alkanol amine condensation products derived from different amines. The modified compositions contained varying concentrations by weight of alkanol amine condensation product solids per total weight of latex paint employed. Each modified paint sample as well as an unmodified paint sample was then inoculated with a mixed culture of organisms consisting largely of the Pseudomonas, Aerobacter and Proteus species and previously isolated from spoiled samples of α-protein, latex and latex paint. One hundred gram portions of the various paint compositions were inoculated with 1.0 milliliter portions of a 24-hour nutrient broth culture of the mixed organisms and maintained at 37° C. for three days. Multiple streaks were made from these samples on poured nutrient agar plates and the plates incubated at 37° C. for three days. At the end of this period streaks made from inoculated unmodified paint samples showed heavy growth while streaks made from inoculated paint samples modified by the addition of the aforementioned alkanol amine condensation products showed no sign of microbial growth. The following table sets forth the results obtained:

Table 1

| Alkanol Amine | Moles of HCHO per Mole of Alkanol Amine | Percentage Concentration of Condensation Product | pH of Modified Latex Paint Formulation | Microbial Growth |
|---|---|---|---|---|
| 1-Amino-2-butanol | 1.5 | 0.3 | 8.9 | None. |
| Do | 1.5 | 0.5 | 8.9 | Do. |
| Do | 1.0 | 0.3 | 9.0 | Do. |
| Do | 1.0 | 0.5 | 9.2 | Do. |
| 3-Amino-1-propanol | 1.5 | 0.3 | 8.7 | Do. |
| Do | 1.5 | 0.5 | 8.7 | Do. |
| Do | 1.0 | 0.5 | 9.15 | Do. |
| Do | 1.0 | 0.3 | 9.0 | Slight. |
| 2-Amino-1-ethanol | 1.0 | 0.3 | 8.6 | None. |
| Do | 1.0 | 0.5 | 8.7 | Do. |
| Do | 1.5 | 0.3 | 8.6 | Do. |
| Do | 1.5 | 0.5 | 8.6 | Do. |
| 1-Amino-2-propanol | 1.0 | 0.3 | 8.8 | Do. |
| Do | 1.0 | 0.5 | 8.9 | Do. |
| Do | 1.5 | 0.3 | 8.6 | Do. |
| Do | 1.5 | 0.5 | 8.6 | Do. |
| N-Hydroxyethyl-propylenediamine | 2.0 | 0.3 | 8.7 | Do. |
| Do | 2.0 | 0.5 | 8.8 | Do. |
| 1,3-Diamino-2-propanol | 2.0 | 0.5 | 8.6 | None. |
| Do | 2.0 | 0.3 | 8.6 | Slight. |
| Control | | | 8.3 | Heavy. |

EXAMPLE 2

A synthetic GRS type latex of 55 percent vinyl-toluene-45 percent butadiene prepared as previously described was modified by adding alkanol amine condensation products derived from different amines as well as products having different formaldehyde ratios. The modified compositions contained varying percentages by weight of alkanol amine condensation product solids per total weight of latex employed. One hundred gram portions of the various latex compositions were inoculated with 1.0 milliliter portions of a 24-hour nutrient broth culture of the same mixed organisms employed in Example 1 and maintained at 37° C. for two days. Multiple streaks were made from these samples on poured nutrient agar plates and the plates incubated at 37° C. for three days and observed for growth at the end of this period. The following table summarizes the results obtained:

Table 2

| Alkanol Amine | Moles of HCHO per Mole of Alkanol Amine | Percentage Concentration of Condensation Product | pH of Modified Latex Formulation | Microbial Growth |
|---|---|---|---|---|
| 1,3-Diamino-2-propanol | 2.0 | 0.4 | 9.15 | None. |
| Do | 2.0 | 0.6 | 9.2 | Do. |
| Do | 2.0 | 0.8 | 9.2 | Do. |
| 1-Amino-2-propanol | 1.5 | 0.7 | 9.35 | Do. |
| Do | 1.5 | 0.9 | 9.3 | Do. |
| 3-Amino-1-propanol | 1.0 | 0.7 | 10.0 | Do. |
| Control | | | 8.55 | Heavy. |

EXAMPLE 3

Synthetic latexes including commercially available latexes of varying monomer composition were modified by addition of an alkanol amine condensation product of one mole of 1,3-diamino-2-propanol with two moles of formaldehyde to give a series of latexes containing 0.7 percent by weight of the alkanol amine condensation product based on the total weight of latex. The pH of the latex samples were then determined and 100 gram portions of the modified as well as the unmodified samples were inoculated with 1.0 milliliter portions of a nutrient broth suspension of organisms, streaked and incubated as described in Example 2 and observed for growth at the end of the incubation period.

Table 3

| Latex | Percentage Concentration of Condensation Product | pH | Microbial Growth |
|---|---|---|---|
| Hycar-1562 [1] | None | 8.3 | Yes. |
| Do [1] | 0.7 | 8.65 | No. |
| Elvacet 81-900 [2] | None | 4.6 | Yes. |
| Do [2] | 0.7 | 7.0 | No. |
| Rhoplex AC33 [3] | None | 9.1 | Yes. |
| Do [3] | 0.7 | 9.1 | No. |
| Resyn 12K51 [4] | None | 4.8 | Yes. |
| Do [4] | 0.7 | 6.9 | No. |
| Neoprene 735 [5] | None | 7.3 | Yes. |
| Do [5] | 0.7 | 8.2 | No. |
| Latex A [6] | None | 8.2 | Yes. |
| Do [6] | 0.7 | 8.6 | No. |
| Latex B [7] | None | 9.0 | Yes. |
| Do [7] | 0.7 | 9.4 | No. |

[1] Commercial acrylonitrile-butadiene copolymer.
[2] Commercial polyvinylacetate.
[3] Commercial ethyl acrylate-methyl methacrylate copolymer.
[4] Commercial polyvinylacetate copolymer.
[5] Commercial chloroprene polymer.
[6] An 80% styrene-20% butadiene copolymer.
[7] Polystyrene.

EXAMPLE 4

A product obtained by condensing 1 molar proportion of 1,3-diamino-2-propanol with 2 molar proportions of formaldehyde was incorporated in styrene-butadiene latexes. The condensation products were added in the amount of 2 parts by weight for each 100 parts by weight of the solids in the latex. Free films were prepared from latexes of varying monomer composition and varying pH and were then tested for heat stability. The films of about 5 mil thickness prepared by casting the latex on clean glass were dried, stripped, placed in a metal frame and exposed to heat in an oven held at 100° C. The films were checked for flexibility and discoloration at given intervals. The results are given in the following table:

Table 4

| Latex | pH | Hours Exposed | Condition of Film |
|---|---|---|---|
| C [1] | 10.5 | 100 | Very slightly brittle. |
| C | 8.1 | 100 | No change. |
| D [2] | 10.4 | 100 | Do. |
| D | 8.0 | 100 | Do. |
| C (Control) | 10.4 | 24 | Brittle, yellow. |
| D (Control) | 10.4 | 24 | Do. |

[1] A 60% styrene-40% butadiene copolymer.
[2] A 67% styrene-33% butadiene copolymer.

EXAMPLE 5

Free films were prepared from styrene-butadiene latexes of varying monomer composition as well at latexes modified by the addition of a condensation product of one molar proportion of 1,3-diamino-2-propanol with two molar proportions of formaldehyde as described in Example 4. These films were exposed in a standard Fade-O-meter for 100 hours at 110° F. At given intervals the films were checked for flexibility and discoloration. The results are given in the following table:

Table 5

| Latex | Condensation Product [1] | pH | Hours Exposed | Condition of Film |
|---|---|---|---|---|
| C [2] | 2 | 10.5 | 100 | No change. |
| C | 2 | 8.1 | 100 | Slight discoloration; Slight stiffening. |
| D [3] | 2 | 10.4 | 100 | No change. |
| D | 2 | 8.0 | 100 | Do. |
| C | None | 10.4 | 24 | Very brittle; yellow-brown. |
| D | None | 10.4 | 24 | Do. |

[1] Parts by weight of condensation product solids added for each 100 parts of latex solids.
[2] A 60% styrene-40% butadiene copolymer.
[3] A 67% styrene-33% butadiene copolymer.

EXAMPLE 6

A synthetic GRS type latex of 55 percent vinyl-toluene-45 percent butadiene prepared as previously described was modified by adding several alkanol amine condensation products at different concentration levels. The treated latexes were cast on clean glass plates as 10 mil wet films. After the films had dried, they were stripped, placed in a frame and tested for stability on exposure to light from a carbon electrode arc lamp in a standard Fade-O-Meter. The results are given in the table below:

Table 6

| Alkanol Amine | Moles HCHO per Mole Alkanol Amine | Concentration [1] | Hours Exposed | Condition of Film |
|---|---|---|---|---|
| N-Hydroxyethyl-propylenediamine. | 2 | 3 | 42 | Slight stiffness. |
| Do. | 2 | 5 | 42 | Do. |
| 1,3-Diamino-2-propanol. | 1.5 | 1 | 42 | Do. |
| Do. | 1.5 | 3 | 42 | No change. |
| Do. | 1.5 | 5 | 42 | Do. |
| Do. | 2 | 3 | 42 | Do. |
| Do. | 2 | 5 | 42 | Do. |
| None. | | | 42 | Almost brittle. |
| 1,3-Diamino-2-propanol. | 1.5 | 5 | 113 | No change. |
| Do. | 2 | 5 | 113 | Do. |
| None. | | | 113 | Brittle; slight yellowing. |

[1] Parts by weight of solid condensation product per each 100 parts by weight of latex solids.

We claim:

1. An aqueous colloidal dispersion comprising (1) a synthetic latex containing in the disperse phase a polymer obtained by polymerizing an olefinically unsaturated monomer containing in its structure at least one ethylenic group having the $CH_2=CH-$ linkage, wherein said ethylenic group is joined to an atom selected from the group consisting of carbon and oxygen and (2) from about 0.3 to 5 percent by weight based on the weight of solids present in synthetic latex of a water-soluble condensation product obtained by the reaction of from about 1 to 3 molar proportions of formaldehyde with one molar proportion of a lower molecular weight aliphatic alkanolamine, said alkanolamine embodying a straight chain structure of at least 3 atoms of the group consisting of carbon and nitrogen, the nitrogen in said structure being attached only to carbon and hydrogen, and including in the molecule a hydroxyl radical and from 1 to 2 amino radicals wherein at least one amino radical is a primary amino group, and wherein said condensation product is obtained in a reaction carried out while maintaining the temperature of the reaction mixture below about 60° C.

2. An aqueous colloidal dispersion comprising (1) a synthetic latex containing in the disperse phase a copolymer of a conjugated diolefin and vinylaromatic compound and (2) from about 0.3 to 5 percent by weight based on the weight of solids present in synthetic latex of a water-soluble condensation product obtained by the reaction of from about 1 to 3 molar proportions of formaldehyde with one molar proportion of a lower molecular weight aliphatic alkanolamine, said alkanolamine embodying a straight chain structure of at least 3 atoms of the group consisting of carbon and nitrogen, the nitrogen in said structure being attached only to carbon and hydrogen, and including in the molecule a hydroxyl radical and from 1 to 2 amino radicals wherein at least one amino radical is a primary amino group and wherein said condensation product is obtained in a reaction carried out while maintaining the temperature of the reaction mixture below about 60° C.

3. An aqueous colloidal dispersion comprising (1) a synthetic latex containing in the disperse phase a copolymer of butadiene and a vinylaromatic compound and (2) from about 0.3 to 5 percent by weight based on the weight of solids present in synthetic latex of a water-soluble condensation product obtained by the reaction of from about 1 to 3 molar proportions of formaldehyde with one molar proportion of a lower molecular weight aliphatic alkanolamine, said alkanolamine embodying a straight chain structure of at least 3 atoms of the group consisting of carbon and nitrogen, the nitrogen in said structure being attached only to carbon and hydrogen, and including in the molecule a hydroxyl radical and from 1 to 2 amino radicals wherein at least one amino radical is a primary amino group and wherein said condensation product is obtained in a reaction carried out while maintaining the temperature of the reaction mixture below about 60° C.

4. An aqueous colloidal dispersion comprising (1) a synthetic latex containing in the disperse phase a copolymer of from 25 to 75 percent by weight of butadiene and correspondingly from 75 to 25 percent by weight of vinylaromatic hydrocarbon and (2) from about 0.3 to 5 percent by weight based on the weight of solids present in synthetic latex of a water-soluble condensation product obtained by the reaction of from about 1 to 3 molar proportions of formaldehyde with one molar proportion of a lower molecular weight aliphatic alkanolamine, said alkanolamine embodying a straight chain structure of at least 3 atoms of the group consisting of carbon and nitrogen, the nitrogen in said structure being attached only to carbon and hydrogen, and including in the molecule a hydroxyl radical and from 1 to 2 amino radicals wherein at least one amino radical is a primary amino group and wherein said condensation product is obtained in a reaction carried out while maintaining the temperature of the reaction mixture below about 60° C.

5. A water-dispersible synthetic latex comprising a polymer obtained by polymerizing an olefinically unsaturated monomer containing in its structure at least one ethylenic group having the $CH_2=CH-$ linkage wherein said ethylenic group is joined to an atom selected from the group consisting of carbon and oxygen, and intimately blended therein from about 0.3 to 5 percent by weight based on the weight of solids present in synthetic latex of a water-soluble condensation product obtained by the reaction of from about 1 to 3 molar proportions of formaldehyde with one molar proportion of a lower molecular weight aliphatic alkanolamine, said alkanolamine embodying a straight chain structure of at least 3 atoms of the group consisting of carbon and nitrogen, the nitrogen in said structure being attached only to carbon and hydrogen, and including in the molecule a hydroxyl radical and from 1 to 2 amino radicals wherein at least one amino radical is a primary amino group and wherein said condensation product is obtained in a reaction carried out while maintaining the temperature of the reaction mixture below about 60° C.

6. A water-dispersible synthetic latex comprising a polymer obtained by polymerizing an olefinically unsaturated monomer containing in its structure at least one ethylenic group having the $CH_2=CH-$ linkage wherein said ethylenic group is joined to an atom selected from the group consisting of carbon and oxygen, and intimately blended therein from 0.75 to 5 percent by weight based on the weight of solids present in synthetic latex of a water-soluble condensation product obtained by the reaction of from about 1 to 3 molar proportions of formaldehyde with one molar proportion of a lower molecular weight aliphatic alkanolamine, said alkanolamine embodying a straight chain structure of at least 3 atoms of the group consisting of carbon and nitrogen, the nitrogen in said structure being attached only to carbon and hydrogen, and including in the molecule a hydroxyl radical and from 1 to 2 amino radicals wherein at least one amino radical is a primary amino group and wherein said condensation product is obtained in a reaction carried out while maintaining the temperature of the reaction mixture below about 60° C.

7. A latex paint composition consisting of an aqueous colloidal dispersion comprising (1) a pigment, (2) a synthetic latex containing in the disperse phase a polymer obtained by polymerizing an olefinically unsaturated monomer containing at least one ethylenic group having the $CH_2=CH-$ linkage wherein said ethylenic group is joined to an atom selected from the group consisting of carbon and oxygen and (3) from about 0.15 to 3 percent by weight based on the total weight of paint of a water-soluble condensation product obtained by the reaction of from about 1 to 3 molar proportions of formaldehyde with one molar proportion of a lower molecular weight aliphatic alkanolamine, said alkanolamine embodying a straight chain structure of at least 3 atoms of the group consisting of carbon and nitrogen, the nitrogen in said structure being attached only to carbon and hydrogen, and including in the molecule a hydroxyl radical and from 1 to 2 amino radicals wherein at least one amino radical is a primary amino group, and wherein said condensation product is obtained in a reaction carried out while maintaining the temperature of the reaction mixture below about 60° C.

8. A latex paint composition consisting of an aqueous colloidal dispersion comprising (1) a pigment, (2) a synthetic latex containing in the disperse phase a copolymer of from 25 percent to 75 percent by weight of a vinylaromatic hydrocarbon and (3) from about 0.3 to 1.25 percent by weight based on the total weight of paint of a water-soluble condensation product obtained by the reaction of from about 1 to 3 molar proportions of formaldehyde with one molar proportion of a lower molecular weight aliphatic alkanolamine, said alkanolamine embodying a straight chain structure of at least 3 atoms of the group consisting of carbon and nitrogen, the nitrogen in said structure being attached only to carbon and hydrogen, and including in the molecule a hydroxyl radical and from 1 to 2 amino radicals wherein at least one amino radical is a primary amino group and wherein said condensation product is obtained in a reaction carried out while maintaining the temperature of the reaction mixture below about 60° C.

9. A method for imparting improved properties to aqueous colloidal dispersions comprising synthetic latexes, said synthetic latexes containing in the disperse phase a polymer obtained by polymerizing an olefinically unsaturated monomer containing in its structure at least one ethylenic group having the $CH_2=CH-$ linkage wherein said ethylenic group is joined to an atom selected from the group consisting of carbon and oxygen, which includes the step of intimately blending therein a composition comprising from about 0.3 to 5 percent by weight based on the weight of solids present in synthetic latex of a water-soluble condensation product obtained by the reaction of from about 1 to 3 molar proportions of formaldehyde with one molar proportion of a lower molecular weight aliphatic alkanolamine, said alkanolamine embodying a straight chain structure of at least 3 atoms of the group consisting of carbon and nitrogen, the nitrogen in said structure being attached only to carbon and hydrogen, and including in the molecule a hydroxyl radical and from 1 to 2 amino radicals wherein at least one amino radical is a primary amino group and wherein said condensation product is obtained in a reaction carried out while maintaining the temperature of the reaction mixture below about 60° C.

10. A method for imparting improved properties to latex paint compositions which comprises blending in the water-dispersible synthetic latex constituent of paint, said synthetic latex containing in the disperse phase a polymer obtained by polymerizing an olefinically unsaturated monomer containing in its structure at least one ethylenic group having the $CH_2=CH-$ linkage wherein said ethylenic group is joined to an atom selected from the group consisting of carbon and oxygen, from about 0.15 to 3 percent by weight based on the total weight of paint of a water-soluble condensation product obtained by the reaction of from about 1 to 3 molar proportions of formaldehyde with one molar proportion of a lower molecular weight aliphatic alkanolamine, said alkanolamine embodying a straight chain structure of at least 3 atoms of the group consisting of carbon and nitrogen, the nitrogen in said structure being attached only to carbon and hydrogen, and including in the molecule a hydroxyl radical and from 1 to 2 amino radicals wherein at least one amino radical is a primary amino group, and wherein said condensation product is obtained in a reaction carried out while maintaining the temperature of the reaction mixture below about 60° C.

References Cited in the file of this patent

UNITED STATES PATENTS

| | | |
|---|---|---|
| 2,194,314 | Maxwell | Mar. 19, 1940 |
| 2,226,534 | Lichty | Dec. 31, 1940 |
| 2,511,113 | La Piana et al. | June 13, 1950 |

FOREIGN PATENTS

| | | |
|---|---|---|
| 612,253 | Great Britain | Nov. 10, 1948 |